United States Patent [19]

Lamy et al.

[11] Patent Number: 4,532,824
[45] Date of Patent: Aug. 6, 1985

[54] AUTOMOBILE AUTOMATIC TRANSMISSION CONTROL DEVICE

[75] Inventors: Jean-Michel Lamy, Paris; Joël Jacquet, Nanterre, both of France

[73] Assignee: Regie Nationale des Usines Renault, Paris, France

[21] Appl. No.: 456,295

[22] Filed: Jan. 6, 1983

[30] Foreign Application Priority Data

Jan. 6, 1982 [FR] France ............... 82 00108

[51] Int. Cl.³ .................................. G05G 5/14
[52] U.S. Cl. ............................ 74/475; 74/538; 74/476
[58] Field of Search ........... 74/473 R, 476, 475, 74/538

[56] References Cited

U.S. PATENT DOCUMENTS

| | | | |
|---|---|---|---|
| 3,241,640 | 3/1966 | McCordic et al. | 74/475 X |
| 3,270,580 | 9/1966 | Wagner | 74/475 |
| 3,406,587 | 10/1968 | Brilando et al. | 74/475 |
| 3,728,908 | 4/1973 | Bieber | 74/473 R |
| 3,863,520 | 2/1975 | Moline et al. | 74/475 |
| 4,267,744 | 5/1981 | Yamasaki | 74/475 |
| 4,304,143 | 12/1981 | Nagano | 74/473 R |
| 4,365,522 | 12/1982 | Kubota et al. | 74/475 |
| 4,442,730 | 4/1984 | Snoy | 74/475 |

FOREIGN PATENT DOCUMENTS

| | | | |
|---|---|---|---|
| 2366100 | 10/1978 | Fed. Rep. of Germany | 74/476 |
| 2939035 | 4/1981 | Fed. Rep. of Germany | |
| 2040437 | 1/1971 | France | |
| 2437316 | 4/1980 | France | |
| 56-39996 | 4/1981 | Japan | 74/538 |
| 2017838 | 10/1979 | United Kingdom | |

*Primary Examiner*—Allan D. Herrmann
*Assistant Examiner*—Joseph M. Rolnicki
*Attorney, Agent, or Firm*—Oblon, Fisher, Spivak, McClelland & Maier

[57] ABSTRACT

An automobile automatic transmission control device consists of a sector fixed to a vehicle. A control lever is pivoted to the sector about a fixed axis. A plurality of lockout notches are formed on an edge of the sector along a locus centered on said fixed axis. A plurality of self-locking notches are formed in said sector about a locus centered on said fixed axis. The control lever is provided with a rod biased into engagement with the lockout notches so as to prevent the unintentional pivoting of the lever. The control lever is also provided with a plurality of self-locking elements which cooperate with the self-locking notches to establish transmission selection positions. The rod can be moved out of engagement with the lockout notches by engagement of a trigger release mounted on one end of the lever.

6 Claims, 2 Drawing Figures

AUTOMOBILE AUTOMATIC TRANSMISSION CONTROL DEVICE

BACKGROUND OF THE INVENTION

1. Field of the Invention

This invention concerns an automobile automatic transmission control device consisting of a control lever mounted such that it is able to pivot in a plane with respect to the vehicle, for example on its floor, elastic self-locking mechanisms to define several pivoting positions of the said lever corresponding to the different selection positions for the transmission, lockout mechanisms preventing the unintentional pivoting of the said lever in some of the said positions, and mechanisms for the deliberate override of the lockout action, controlled from the operator handgrip of the said lever against the action of a return spring.

2. Description of the Prior Art

There are existing automatic transmission control devices whose structure is based on that of pivoting lever type handbrakes. These handbrake controls generally feature a notched sector against which a finger is biased to serve as a lock. Automatic transmission controls of the handbrake type require a complicated mechanism consisting of a large number of parts (pushrods, return devices, axes, springs).

Other automatic transmission control devices provide a lockout by means of a lateral stop fixed on a tube sliding on the lever itself. The elastic self-locking mechanisms are here placed laterally, making it difficult to integrate them in the control. Moreover, the unit is awkward because it must be reinforced in order to withstand the torque attributable to the lateral lockout (forces arising during sudden movements, for example).

SUMMARY OF THE INVENTION

The object of this invention is an automatic transmission control device whose structure is simple, compact and light.

The invention also covers an automatic transmission control device which, with minimal modifications, can be mounted on a number of different vehicles.

The self-locking parts each consist of a ball forced by a spring to interact with the self-locking notches of the sector. Preferably, each ball is mounted, with its spring, in a capsule which can be attached as a unit to the lever, for example by snapping in through a hole in one of the two branches of the lever.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
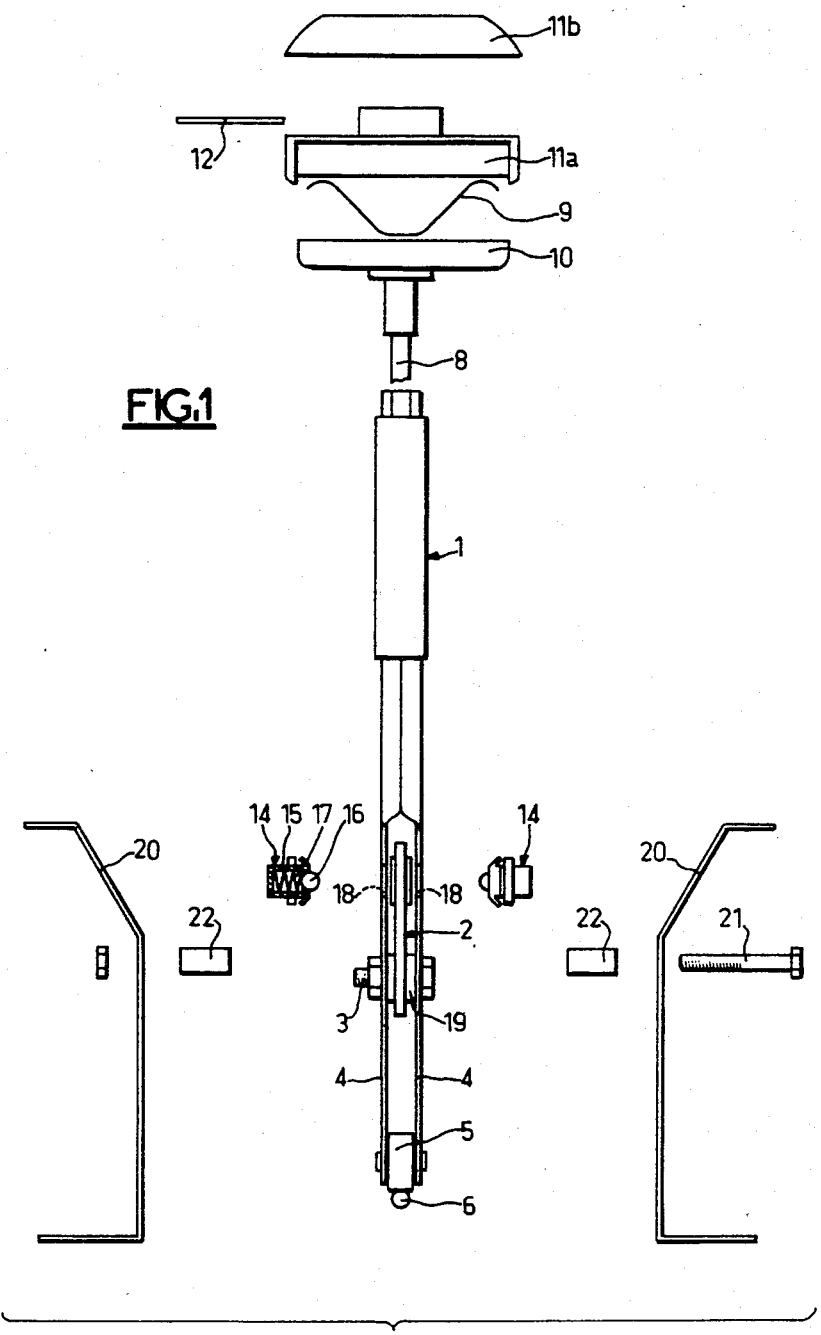
FIG. 1 is an exploded front view of the automobile automatic transmission control device of the invention.

The automobile automatic transmission control device according to FIG. 1 consists of two subassemblies, namely a control subassembly and a support subassembly for the control subassembly.

Figure 2:
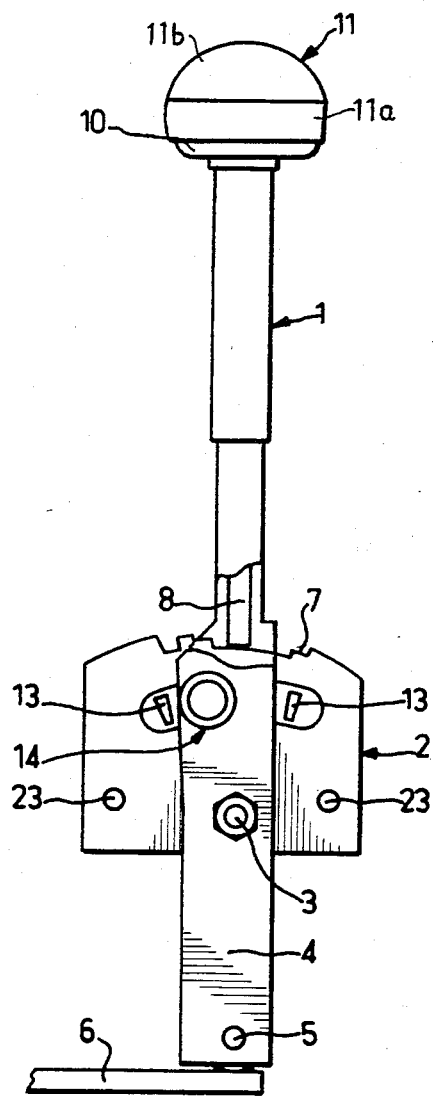
FIG. 2 is a side view of the same device, without the mechanisms for mounting the device in the vehicle.

The control subassembly, which is illustrated without the support subassembly in FIG. 2, consists of a control lever 1 and a lockout and self-locking sector 2.

The lever is mounted so as to pivot about a transverse axis 3 passing through the sector 2. To this end, the lever 1, which has a tubular section in the portion located above the sector 2, is divided, at the top of the sector 2, into two branches 4 extending down along the two opposite sides of the sector 2. At its lower end below the sector 2, the lever 1 is connected by a hinge mechanism 5 to an automatic transmission control cable or rod 6.

The upper part of the sector 2 features lockout notches define a first locus and 7 on its edge. These notches, in a known manner, combine with a lockout part connected to the control lever 1 to form a lockout system preventing the unintentional movement of the lever 1 in certain selection positions for the automatic transmission. In this case, the notches 7 must prevent unintentional movement of the lever from the park position to the reverse position of the transmission, as well as perhaps to one or more positions corresponding to limited automatic control at a few forward gear positions.

The lockout part working with the notches 7 is made up of a rod 8 which moves axially within the upper tubular part of the lever 1. The lower end of the rod 8 is kept in contact with the notches 7 of the sector 2 by a spring 9. This spring is inserted between a stop 10 fixed to the upper end of the rod 8 and the handgrip 11 of the lever 1. FIG. 1 shows that the handgrip 11 consists of a lower shell 11a which is attached by a transverse cotter pin 12 to the upper end of the lever 1, with the spring 9 being inserted between this shell 11a and the stop 10, and an upper shell 11b snap fitted onto shell 11a. The trigger release or stop 10 is situated with respect to the handgrip 11 in such a way as to be within reach of the driver's fingers when he grasps the handgrip 11 in order to select the automatic transmission position.

In order to precisely define the various selection positions for the automatic transmission and to enable the drive to "feel" these various selection positions, an elastic self-locking system, known as the "ball lock" type, is provided for between the lever 1 and the sector 2. To this end, one each of its two opposing flat sides, sector 2 is provided with a number of notches 13 defining a second locus, corresponding to the number of selection positions and lying substantially in a common radial segment with notches 7 about axis 3. In turn, on each of the two branches 4 of its lower part, opposite the self-locking notches of sector 2, the lever 1 features self-locking ball capsules 14 including, inside a capsule 15, a ball 16 and a spring 17 inserted between the ball 16 and the bottom of the capsule 15. The capsule also includes means for snapping in a hole 18 of each branch 4 of the lever 1 in a position such that the ball 16, biased by the spring 17, cooperates with the notches 13 of the corresponding surface of the sector 2.

The sector 2 may be manufactured in various ways.

It is possible mold the sector 2, preferably of a plastic material, integrally with the lockout notches 7, the self-locking notches 13 and, preferably, a sleeve/stay bolt mechanism 19 for the bolt 3 which forms a pivot axis for the lever 1.

Furthermore, it is also possible to make the sector 2 of sheet metal, with the lockout notches 7 being cutouts in the sheet. These lockout notches could also be plastic cast on the sheet metal sector in the same way as the self-locking notches 13, or rather the parts situated between the self-locking notches 13. The sleeve/stay bolt mechanism 19 for the hinge axis 3 of the lever 1 may, in this case, also be cast from plastic fitted on the pivot axis, or may be for example in the form of two separate sleeves/stay bolts.

The support subassembly of the control subassembly described above may include, as shown in FIG. 1, for example, two flanges 20 made of sheet metal or any other material, said flanges being arranged on each side of the control subassembly so as to make it possible to mount the latter to, for example, the floor of a vehicle (not shown). In order to be able to use the same control subassembly on different vehicles, it thus suffices to mount a support subassembly adapted to the structure of the vehicle in question and then attach the control subassembly, which remains unchanged, to the support subassembly.

In the illustrated embodiment, the mounting of the control subassembly to the support subassembly is done by clamping the sector 2 between the two flanges 20 by means of two bolts 21 and sleeves 22 inserted between the sector 2 and each flange 20. FIG. 2 shows the the sector 20 features two holes 23 for the passage of the bolts 21, said holes being situated one in front of and the other behind the axis of articulation 3 of the lever 1 on the sector 2.

What is claimed as new and desired to be secured by Letters Patent of the United States is:

1. A vehicle automatic transmission control device comprising:
    a sector fixed to said vehicle, said sector including a plurality of lockout notches on one edge thereof and a plurality of self-locking notches in the body thereof;
    a control lever pivoted about an axis fixed to said sector, said lockout notches and self-locking notches being respectively arranged on first and second loci about said pivot axis, said control lever being connected to said transmission, wherein said first locus is further from said pivot axis than is said second locus and wherein said lockout notches and said self-locking notches lie substantially in a common radial segment, wherein a width of said common radial segment substantially corresponds in extent to widths of each of said first and second loci;
    a rod movable along a longitudinal axis of said control lever and within a portion of said control lever, a portion of said rod being engageable with said lockout notches when said rod is in a first position;
    a trigger release mounted on one end of said control lever;
    a hand grip fixed to said control lever;
    biasing means associated with said hand grip and said trigger release for biasing said rod into said first position; and
    elastic self-locking elements mounted on said control lever at positions corresponding to said self-locking notches and engageable with said self-locking notches,
    whereby coaction of said self-locking notches and said self-locking elements define pivot positions of said control lever corresponding to transmission selection positions, and whereby coaction of said lockout notches and said rod prevents unintentional pivoting of said lever.

2. Device of claim 1 wherein said portion of said lever is in tubular form and is divided adjacent said sector into two branches situated on opposing sides of the sector.

3. Device of claim 2 wherein each of said self-locking elements is mounted on one of said two branches of said lever.

4. Device of claim 3, wherein each said branch includes a hole and each of said capsules is attached to said lever by snapping said capsule into said hole in one of the said branches of the lever.

5. The device of claim 1 wherein said sector is fixed to said vehicle via a support subassembly.

6. Device of claim 5 wherein each said self-locking element consists of a ball and a spring enclosed in a capsule which can be attached to said lever.

* * * * *